(12) United States Patent
Mercier

(10) Patent No.: US 8,656,632 B1
(45) Date of Patent: Feb. 25, 2014

(54) OUTRIGGER LINE MANAGEMENT SYSTEM

(76) Inventor: Craig Mercier, Harmans, MD (US)

( * ) Notice: Subject to any disclaimer, the term of this patent is extended or adjusted under 35 U.S.C. 154(b) by 760 days.

(21) Appl. No.: 12/726,695

(22) Filed: Mar. 18, 2010

(51) Int. Cl.
*A01K 91/08* (2006.01)
*B63B 35/14* (2006.01)
*A01K 91/053* (2006.01)

(52) U.S. Cl.
USPC ........... 43/27.4; 43/43.12; 43/42.74; 114/255

(58) Field of Classification Search
USPC ............... 43/27.4, 43.12, 43.13, 42.74, 27.2, 43/21.2; 114/255, 364; 211/119.01, 211/119.02, 119.03, 119.1, 119.11, 119.12, 211/119.13, 119.14
See application file for complete search history.

(56) References Cited

U.S. PATENT DOCUMENTS

| | | | | |
|---|---|---|---|---|
| 53,797 A | * | 4/1866 | Epperson et al. | 211/119.1 |
| 133,530 A | * | 12/1872 | Hadden | 211/119.1 |
| 398,490 A | * | 2/1889 | Bried | 211/119.1 |
| 667,453 A | * | 2/1901 | Parker | 211/119.02 |
| 790,336 A | * | 5/1905 | Yoehger | 43/42.74 |
| 1,032,395 A | * | 7/1912 | Foss | 211/119.1 |
| 1,134,850 A | * | 4/1915 | Hebert et al. | 211/119.1 |
| 1,157,502 A | * | 10/1915 | Budaji | 211/119.01 |
| 1,163,193 A | * | 12/1915 | Althoff | 43/27.2 |
| 1,336,186 A | * | 4/1920 | Baron | 211/119.1 |
| 1,840,762 A | * | 1/1932 | Akervick | 43/42.74 |
| 2,037,232 A | * | 4/1936 | Hendriks | 43/42.74 |
| 2,196,472 A | * | 4/1940 | Moriarty | 43/27.4 |
| 2,206,174 A | * | 7/1940 | Falk | 211/119.1 |
| 2,292,415 A | * | 8/1942 | Waldheim | 211/119.02 |
| 2,303,753 A | * | 12/1942 | Merle | 43/42.74 |
| 2,340,608 A | * | 2/1944 | Merle | 43/42.74 |
| 2,352,631 A | * | 7/1944 | Guarnieri | 43/42.74 |
| 2,550,282 A | * | 4/1951 | McAvoy | 43/27.2 |
| 2,594,158 A | * | 4/1952 | Hannameyer | 211/119.01 |
| 2,599,081 A | * | 6/1952 | Waddell | 211/119.13 |
| 2,834,476 A | * | 5/1958 | Picone, Jr. | 211/119.02 |
| 2,838,866 A | * | 6/1958 | Labin | 43/43.12 |
| 2,912,782 A | * | 11/1959 | Maximov | 43/27.2 |
| 2,951,307 A | * | 9/1960 | Joy et al. | 43/27.4 |
| 3,060,614 A | * | 10/1962 | Prince | 43/21.2 |
| 3,193,964 A | * | 7/1965 | Hurst | 43/43.12 |
| 3,355,835 A | * | 12/1967 | Lyons | 43/27.4 |
| 3,358,399 A | * | 12/1967 | Waldmann | 43/43.12 |
| 3,462,870 A | * | 8/1969 | Terilli | 43/27.4 |
| 3,650,063 A | * | 3/1972 | Pierce et al. | 43/42.74 |
| 3,656,630 A | * | 4/1972 | Miguel | 211/119.11 |
| 3,787,995 A | * | 1/1974 | Watanabe | 43/43.12 |
| 3,835,567 A | * | 9/1974 | Humbert et al. | 43/6.5 |
| 3,959,913 A | * | 6/1976 | Weber | 43/43.12 |

(Continued)

FOREIGN PATENT DOCUMENTS

| | | | |
|---|---|---|---|
| FR | 2613905 A1 * | 10/1988 | A01K 91/08 |
| JP | 08214747 A * | 8/1996 | A01K 91/18 |

(Continued)

*Primary Examiner* — Darren W Ark
(74) *Attorney, Agent, or Firm* — Rosenberg, Klein & Lee

(57) ABSTRACT

A line management system for an outrigger structure is provided for guiding outrigger cords through cord passages to maintain an independent longitudinal displacement in order to prevent entanglement. The system includes a plurality of outrigger cords, cord management units, and retention devices. The plurality of cord management units are coupled to the outrigger structure and are longitudinally spaced one from the other along the outrigger structure. Each of the cord management units defines a plurality of transversely offset cord passages respectively guiding predetermined ones of outrigger cords to maintain an independent longitudinal displacement relative to the outrigger structure.

17 Claims, 6 Drawing Sheets

(56) References Cited

U.S. PATENT DOCUMENTS

| | | | |
|---|---|---|---|
| 3,968,587 A * | 7/1976 | Kammeraad | 43/27.4 |
| 4,248,002 A * | 2/1981 | McNellis | 43/27.4 |
| 4,388,774 A * | 6/1983 | Thoemke | 43/27.4 |
| 4,610,409 A * | 9/1986 | Emory, Jr. | 43/27.4 |
| 4,632,050 A * | 12/1986 | Rupp | 114/255 |
| 4,756,115 A * | 7/1988 | Reyen | 43/42.74 |
| 4,807,386 A * | 2/1989 | Emory, Jr. | 43/27.4 |
| 4,875,428 A * | 10/1989 | Schlesch et al. | 43/21.2 |
| 5,301,451 A * | 4/1994 | VanAssche | 43/27.4 |
| 5,363,975 A * | 11/1994 | Meade | 211/119.01 |
| 5,375,727 A * | 12/1994 | Lavi | 211/119.01 |
| D366,445 S * | 1/1996 | Seggern | D12/317 |
| 5,673,507 A * | 10/1997 | Stokes, Jr. | 43/21.2 |
| 5,921,196 A * | 7/1999 | Slatter | 43/27.4 |
| 6,149,020 A * | 11/2000 | Gumpel et al. | 211/119.01 |
| 6,454,109 B1 * | 9/2002 | Doyle et al. | 211/119.01 |
| 6,505,431 B1 * | 1/2003 | Christian et al. | 43/43.12 |
| 6,769,377 B2 | 8/2004 | Rupp, II | |
| 6,834,459 B2 * | 12/2004 | van Weenen | 43/27.4 |
| 7,111,574 B2 * | 9/2006 | Slatter | 43/27.4 |
| 7,343,709 B2 * | 3/2008 | van Weenen | 43/27.4 |
| 7,654,214 B2 * | 2/2010 | Rupp, II | 114/255 |
| 7,878,342 B1 * | 2/2011 | Lewis et al. | 211/119.01 |
| 8,109,034 B1 * | 2/2012 | McCauley | 43/27.4 |
| 2006/0231009 A1 * | 10/2006 | Slatter | 114/255 |
| 2009/0188422 A1 | 7/2009 | Rupp, II | |
| 2010/0005702 A1 * | 1/2010 | Palacios Cortell | 43/27.4 |

FOREIGN PATENT DOCUMENTS

| | | | | |
|---|---|---|---|---|
| JP | 11056184 A * | 3/1999 | | A01K 91/18 |
| JP | 2007000143 A * | 1/2007 | | A01K 91/18 |
| WO | WO 03005813 A1 * | 1/2003 | | A01K 91/18 |
| WO | WO 2009056135 A1 * | 5/2009 | | A01K 91/08 |

* cited by examiner

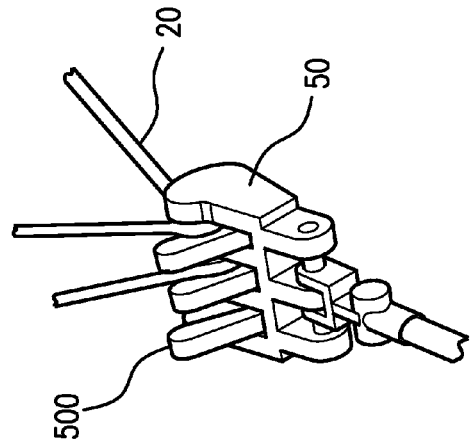
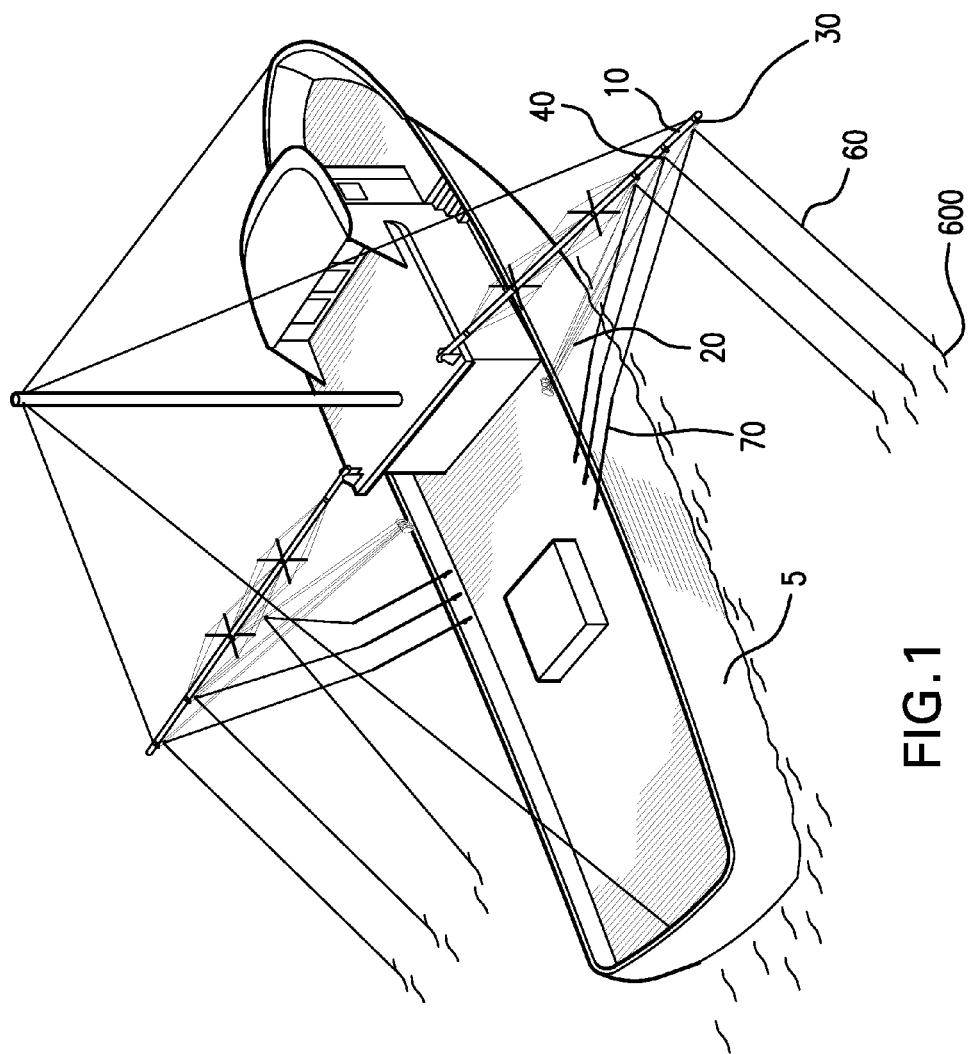
FIG. 1A
FIG. 1

OUTRIGGER LINE MANAGEMENT SYSTEM

BACKGROUND OF THE INVENTION

The subject outrigger line management system is generally directed to a system for enabling convenient displacement of articles along an outrigger structure. More specifically, the outrigger line management system maintains smooth and efficient displacement of individual lines, cords, or other mechanical link employed to so displace articles along a given outrigger support structure.

Outrigger structures are used on surface vessels to extend the lateral reach of the vessel for various purposes. Cast line fishing applications provide one example where outrigger structures provide useful extension of support points for concurrent use of multiple fishing lines. Typically, a fishing rod feeds a fishing line on which one or more baited hooks are provided. The baited ends of the fishing lines are cast into the water to attract fish about the given boat or other surface vessel. Where more than a few fishing lines are so cast from the same vessel into surrounding waters, inter-tangling remains a persistent problem, particularly where the vessel continues moving to, for example, troll the lines through the water. Tangling becomes an even greater threat when the vessel undergoes abrupt turns or encounters fast moving currents. To prevent such interference and tangling, fishing lines may be supported through one or more pivot points displaced along the length of an outrigger structure. The baited ends of different fishing lines are thereby spaced to be dragged through the water, each held safely away from the vessel and one another to avoid interference.

In this manner, outrigger support structures extend fishing/trolling lines laterally out beyond the wake of a moving boat. They allow the safe deployment of multiple fishing lines cast out from the boat each pivoted at different points along the outrigger structure to remain separated by sufficient fishing space (until release of the lines from their pivot points is triggered) to prevent entanglement.

Outrigger structures are usually installed on a boat to be moved inline with the hull or folded into a mast when not in service. Typically, a pair of outrigger structures are installed at starboard and port gunwale locations.

Known outrigger structures are often provided with a plurality of fixed eyehooks longitudinally spaced therealong. A plurality of outrigger cords are then passed through the eyehooks and a pulley assembly disposed at a fixed point on the boat. Each outrigger cord forms a displaceable loop about the pulley assembly and one or more supporting eyehooks, and each carries a clip on which a fishing line may be secured for movement along an outrigger structure with the outrigger cord. A user may retract or advance the clip by pulling the corresponding outrigger cord in one direction or the other through its loop. So when a fishing line is to be baited, the user pulls one outrigger cord to draw the clip within reach, 'loads' the clip with an appropriately baited fishing line that has been cast, then pulls the outrigger cord in a reverse direction to return the loaded clip to a deployment position on the outrigger structure. This process is repeated for each baited fishing line that has been cast out from a certain point on the boat. When a 'bite' occurs, or when a fishing line encounters sufficient tension, the clip releases, so that the line returns to form a direct line between its feeding point (i.e., fishing rod) for active user control.

This process is not without significant practical obstacles to smooth, proper operation. FIG. 7 depicts a portion of an outrigger structure 10' having an eye hook 30' for pivotally retaining its outrigger cords 20', as used in the prior art. Normally, multiple outrigger cords 20' are used to concurrently deploy multiple fishing lines. The multiple outrigger cords 20' passing through the collar-like eyehook 30' invariably bunch together during operation, getting tightly intertwined when subjected to tension and manipulation. Much friction results between the tightly packed outrigger cords 20' themselves, as well as between each cord 20' and eye hook 30'. Being that the outrigger cords are normally supported snugly between the eye hook 30' and other pivot points, a particularly high friction point is created at the sharp bend typically formed at one or more of the eye hooks 30'. The friction makes it very difficult to displace individual outrigger cords to load and deploy their clips, at least not without mighty physical exertion. Moreover, the considerable friction that must be overcome to effect such cord movement causes premature wearing on the cords themselves.

Various outrigger structures are known in the art. By way of example, U.S. Pat. No. 3,462,870 discloses several embodiments of a fishing system that uses a buoy line maintained in a desired area by an airborne kite. The system can have a plurality of lines operated by a fisherman having a reel with a plurality of spools which may be individually wound without disturbing the others. The lines can also be operated by individual fishermen each having a reel. The individual lines may be secured to the buoy line with a releasable clip that disengages when a fish applies tension to the line, allowing that particular line to be cleared of the remaining fishing lines and to be reeled in.

U.S. Pat. No. 3,060,614 is directed to a multiple pole trolling device for mounting on a boat. The multiple pole trolling devices are spaced apart and rotatably mounted on a pole base that is rotatable and tiltably adjustable. Each of the poles has a fixed trolling line located in the water when set to a rearward position. When the assembly is rotated, the line comes out of the water over the boat so that the fish can be removed.

U.S. Pat. No. 2,196,472 is directed to a fishing apparatus in the form of a tree formed of tubular members that support a plurality of fishing lines. The tree may be thrust into the bottom of a body of water. The mast as shown has a set of screws that may be used to adjust the coaxial tubular members for use in water of different depths.

U.S. Pat. No. 3,358,399 is directed to a kite fishing apparatus having two reels, one for a kite line, and the other for a fishing line. A three-in-one glider-type structure is provided and functions to carry the fishing line over the body of water. The baited end of the fishing line is cast out by the outgoing kite line and by means provided to detachably and adjustably connect the kite line to the fishing line.

U.S. Pat. No. 4,388,774 is directed to a fishing line system for use on a boat that supports six fishing rods each spaced from the other to prevent the fishing lines from tangling during trolling. A pull on either side of the boat is mounted on roller booms that can be extended or retracted as required. A rearwardly extending pair of fishing poles are carried by holders mounted on the stern of the boat to position lines laterally inward of lines. The booms are disposed transversely to the left of the boat and are supported by antifriction assemblies which support the booms.

A significant drawback remains in the prior art for effectively managing the outrigger cords to enable loading and deploying of articles along an outrigger structure. There is, therefore, a need for a system that enables sufficiently free, unrestricted individual displacement of the outrigger cords along the outrigger structure.

SUMMARY OF THE INVENTION

It is therefore an object of the present invention to provide a line management system for an outrigger structure which maintains guiding outrigger cords in convenient, independently displaceable manner.

These and other objects are attained by the outrigger line management system formed in accordance with the present invention. The system comprises of a plurality of outrigger cords, cord management units, and retention devices. The plurality of cord management units are coupled to the outrigger structure and are longitudinally spaced one from the other along the outrigger structure. Each of the cord management units defines a plurality of transversely offset cord passages respectively guiding predetermined ones of outrigger cords to maintain an independent longitudinal displacement relative to the outrigger structure. The plurality of retention devices are each coupled to one of the outrigger cords. Each of the retention devices defines a retention point for advancing a fishing line longitudinally along the outrigger structure responsive to a displacement of the outrigger cord.

In certain exemplary embodiments, the system also includes a pivot unit laterally offset from the outrigger structure displaceably retaining each of the outrigger cords. Each of the outrigger cords extends from the pivot unit and through predetermined ones of cord management units in an endless loop.

In another exemplary embodiment, a method for managing the outrigger cords comprises the steps of (1) establishing a plurality of outrigger cords, (2) establishing a plurality of cord management positions, (3) defining each cord management positions, (4) arranging the cord management positions, and (5) establishing a plurality of retention devices. The cord management positions are established longitudinally spaced one from the other along the outrigger structure. Each of the cord management positions are then defined to include a plurality of transversely offset cord passages respectively guiding predetermined ones of the outrigger cords to maintain an independent longitudinal displacement relative to the outrigger structure. The cord management positions are arranged to define a portion of the outrigger structure a progressively decreasing number of cord passages. The retention devices are established to define a retention point for advancing a line longitudinally along the outrigger structure responsive to a displacement of the outrigger cord.

Those skilled in the art will appreciate the scope of the present invention and realize aspects thereof after reading the following detailed description of the preferred embodiments in association with the accompanying illustrative figures.

BRIEF DESCRIPTION OF THE DRAWINGS

The accompanying illustrative figures incorporated in and forming a part of this specification depict several aspects of the invention, and together with the description serve to explain the principles of the invention.

FIG. 1 is a diagram illustrating a view of a line management system installed on a surface vessel in accordance with one exemplary embodiment of the present invention;

FIG. 1A is a diagram illustrating an enlarged view of the pivot unit in the embodiment depicted in FIG. 1;

FIG. 2A is an exploded plan view of a retention device depicted in FIG. 2;

DETAILED DESCRIPTION OF THE PREFERRED EMBODIMENTS

Figure 2:
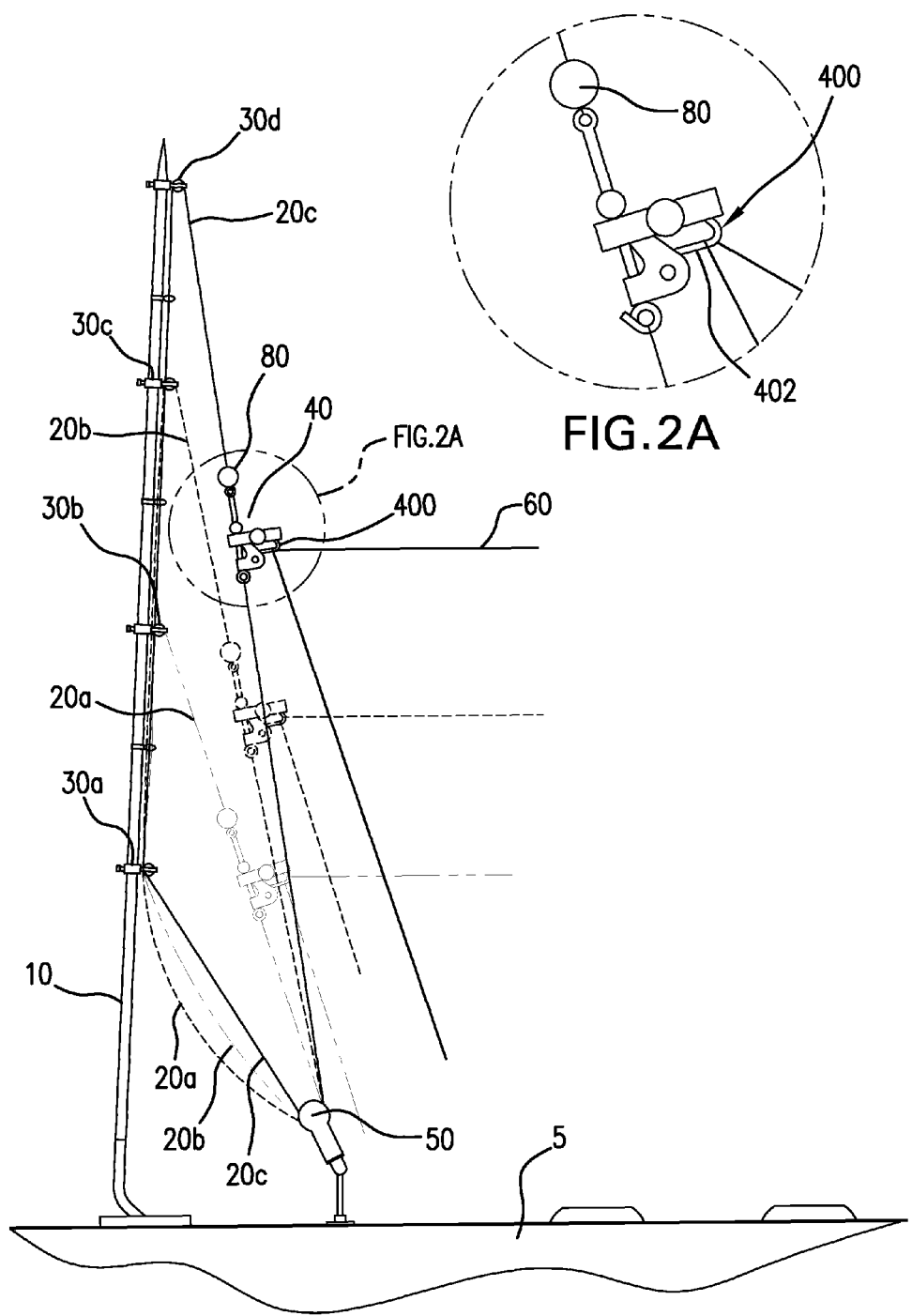
FIG. 2 is a diagram schematically illustrating a portion of the line management system operation on an outrigger structure in accordance with an exemplary embodiment of the present invention.

The embodiments set forth below represent the necessary information to enable those skilled in the art to practice the invention and illustrate the best mode of practicing the invention. In light of the illustrated figures and the following description, those skilled in the art will understand the concepts of the invention and will recognize applications of these concepts not particularly addressed herein. It should be understood that these concepts and applications fall within the scope of the disclosure and accompanying claims.

Wherever possible in the following description, similar reference numerals will refer to corresponding elements on parts of different Drawings unless otherwise indicated.

Referring to FIGS. 1 and 2, there is a depiction of an exemplary embodiment of the line management system 1 for a surface vessel or boat 5. The line management system 1, installed as shown on a boat, includes a plurality of outrigger cords 20, a plurality of cord management units 30, and a plurality of retention devices 40 all coupled to the outrigger structure 10. As depicted in FIG. 1, the outrigger structure 10 may be mounted on top of a surface vessel, to the gunwale or bow, or any other suitable part of the vessel for supporting a plurality of articles therealong. System 1 may be applied to various applications to aid in the smooth loading and deployment of suitable articles to be supported along the outrigger structure 10. The fishing application shown for illustrative purposes herein is but one of numerous such applications where system 1 may be employed in accordance with various aspects of the present invention.

In the fishing application illustrated, the outrigger structure 10 allows the deployment of more fishing lines 60 cast out from the boat each separated from the other by adequate fishing space than would normally be possible. The spacing prevents fishing lines 60 from entangling during trolling with other fishing lines 60 originating from the same boat 5. The number of fishing lines 60 being trolled increases the chances of catching fish and permits multiple individuals to fish from the boat 5. Use of outrigger structure 10 equipped with system 1 in accordance with the present invention mitigates the inherent entanglement risk while preserving ease of use. Each outrigger structure 10 may be suitably formed as one piece, or made up of individual outrigger sections joined together.

In accordance the present invention, a line management system 1 is coupled to each outrigger structure 10 used for support extension purposes—such as to extend support for a fishing line 60 to the side of a boat during trolling. The line management system 1 is used for safely guiding outrigger cords 20 through cord passages to maintain an independent longitudinal displacement in order to prevent entanglement. Typically, when the outrigger structure 10 is in use, it is extended transversely to the length of a boat 5 for trolling fishing lines 60 coupled to the retention device 40. The outrigger structure 10 thus serves to increase the span of the boat to allow more fishing lines 60 to be trolled. By way of example, a 28 foot fishing boat having a 16 foot wide fishing platform can have a pair of outrigger structures 10, with each outrigger structure 10 being 40 foot long. Once the fishing boat 5 is ready to fish, each of the outrigger structures 10 is extended transversely from the boat in opposite directions to effectively create a 96 foot wide fishing platform from which to suspend multiple fishing lines 60.

In one preferred embodiment, a plurality of outrigger cords 20 are supported along the longitudinal length of the outrigger structure 10 by at least one cord management unit 30. Typically, a plurality of cord management units 30 is employed, with each cord management unit 30 firmly coupled to the outrigger structure 10. The cord management units 30 are longitudinally spaced one from the other along the outrigger structure 10.

Each outrigger cord 20 is coupled with a retention device 40 for securing a retention point 400 on a fishing line 60. The retention device 40 facilitates individual management of each fishing line 60 during, for example, sport fishing. When multiple baited fishing lines 60 are being cast out from a boat 5, the retention device 40 allows for each fishing line 60 fed from a certain point on the boat 5, by a fishing rod 70 for instance, to be maintained without interfering with the other fishing lines 60 being trolled.

Each outrigger cord 20 is preferably looped through a pivot unit 50 spaced from an outrigger structure 10 and at least one cord management unit 30 provided on such outrigger structure 10 (as described in following paragraphs). Each outrigger cord 20 remains longitudinally displaceable relative to the outrigger structure 10 so that a user may retract or advance the retention point 400. Each of the retention devices 40 defines a retention point 400 for pivotally supporting a fishing line. This retention point 400 is preferably displaceable longitudinally along the outrigger structure responsive to a displacement of the outrigger cord 20. Typically, the outrigger cord 20 is displaced to retract the retention point 400 or retention device 40 when seeking to attach or manage a fishing line 60. Once the fishing line 60 is attached to the retention device 40, the outrigger cord 20 is then advanced by displacing the outrigger cord 20 to a relative position that gives adequate longitudinal spacing with respect to the other fishing lines 60.

In certain embodiments, the retention device 40 pivotally retains a fishing line 60 at the retention point 400 until sufficient resistance is encountered on the line 60. When a fish bites the line, for instance, the pull on line 60 will cause its release from the retention device 40.

Once retracted, a user may bait, then releasably attach a fishing line 60 to a retention point 400. When the retention point 400 is advanced back out along the given outrigger structure 10, the retention point preferably serves as a point from which the line's baited end extends into the water. One or more fishing lines 60 may be so retained to extend in pivoted manner from a portion of each outrigger cord 20, so long as suitable spacing is maintained to avoid undue line cluttering and tangling. In the embodiment illustrated, one retention device 40 is shown connected to each individual cord 20.

As depicted in FIG. 2, the outrigger cords 20 are individually coupled to a stop cork 80 that acts to limit the displacement of the outrigger cords past a predetermined point. The stop cork 80 limits the displacement by preventing the retention device 40 from unintentionally getting wedged in the cord management unit 30.

In the preferred embodiment, the line management system 1 also includes a pivot unit 50 preferably anchored to a fixed point on the boat 5, laterally offset from the outrigger structure 10 for displaceably retaining a portion of each outrigger cord 20. The pivot unit 50 acts as a pivotal support about which the outrigger cords 20 may be displaced. Each of the outrigger cords 20 extends from the pivot unit 50 and through respective cord management units 30, preferably in an endless loop.

In an exemplary embodiment, the pivot unit 50 includes a plurality of rotatable members 500 individually receiving a respective outrigger cord 20. However, the pivot unit 50 is not limited to a rotatable structure and may be any structure of suitable type to provide a pivot support for displacement of the outrigger cords 20.

Each retention device 40, as depicted in FIG. 2A, is coupled to an outrigger cord 20 and used to transport an intermediate portion of a fishing line 60 relative to outrigger structure 10. Among other things, the retention device 40 comprises of a clip portion 402 and retention point 400. The clip portion 402 allows for the free release of the line 60 when the line is caused to apply sufficient resistance pressure thereon.

When multiple fishing lines 60 are being trolled in the water, in the illustrated embodiment, the lines 60 are preferably maintained by system 1 in such a way that each fishing line 60 clears every other fishing line 60 on its way back towards its feed point (such as the corresponding fishing pole 70) upon released from the clip portion 402. The originating/feed points of the fishing lines 60 are suitably arranged, so that when one fishing line 60 releases from its retention device 40, the fishing line 60 does not physically contact or otherwise interfere with the other deployed fishing lines 60 on its return to a direct line extension from the originating point. It is not unusual to have the retention devices 40 coupled to respective outrigger cords 20 to be displaced in height 8 feet relative to each other, to ensure a clear path of return as a direct line from the feed point (to the water) is restored by a released fishing line 60.

In a typical application, one end of a fishing line 60 may be fed to originate from a fishing rod 70 temporarily secured to a support bracket provided on the boat 5. A distal end 600 is baited and drawn in the water during trolling. The retention point 400 is located between the originating end and distal end 600 of the fishing line. The retention point 400 provides a pivot point from which the distal portion (having the end 600) of the fishing line 60 may be suspended from the outrigger structure 10 for safe trolling. The clip portion 402, which may be made of any suitably resilient or rigid material having enough structural strength to hold the fishing line 60 in place, is configured to open when there is tension on the fishing line 60. For example, when a fish takes the bait at the distal end 600 of the fishing line 60 and causes sufficient tension thereon, the clip portion 402 of the retention device 40 will release. Thereafter, the fishing line 60 must be re-loaded onto the retention device 40 if that line is to be deployed again at its trolling position.

To re-couple fishing line 60 (to re-load a retention device 40), the particular outrigger cord 20 for the clip portion 402 that released the fishing line 60 is pulled to draw the retention device 40/clip portion 402 back in towards the boat until it is within a user's reach. The clip portion 402 is re-loaded by coupling a newly-baited fishing line 60. Once the retention device 40 is drawn in for re-coupling, the clip portion 402 may be snapped open or pulled away from the retention device 40 to an open position so that the fishing line 60 may be hooked by the retention point 400. Thereafter, the retention device 40 is advanced outward again by accordingly displacing its outrigger cord 20. In accordance with one aspect of the present invention, the outrigger cords 20 are independently maintained along respective transversely offset cord passages 304 as described in following paragraphs, such that each may be freely displaced, and the longitudinal displacement of any of the outrigger cords 20 will not interfere with the rest of the outrigger cords 20.

Figure 3:
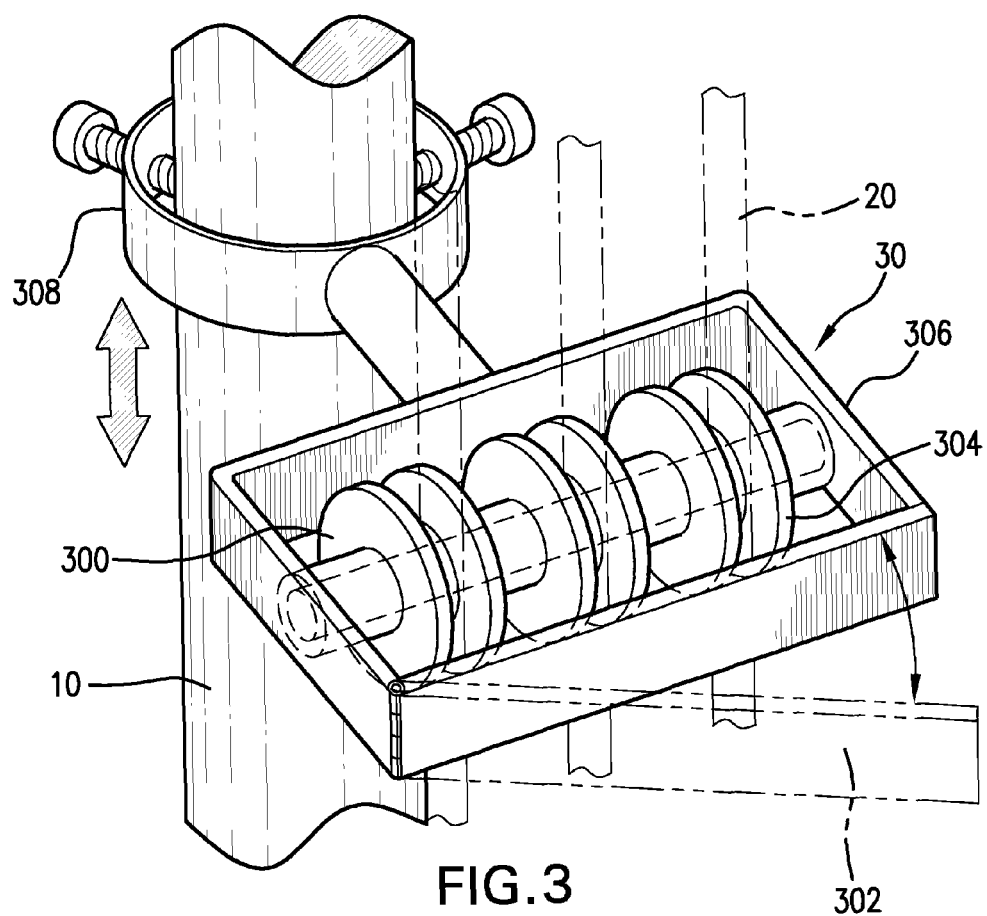
FIG. 3 is a perspective view schematically illustrating a cord management unit formed in accordance with an exemplary embodiment of the present invention.

As depicted in FIG. 3, the line management system 1 also includes at least one a cord management unit 30 for each cord 20. In broad concept, the cord management unit 30 defines a plurality of transversely offset cord passages 304 which independently guide the outrigger cords 20 longitudinally along the outrigger structure 10. The cord management unit 30 allows for multiple outrigger cords 20 to be independently controlled without undue interference from the other outrigger cords 20.

Each cord management unit 30 preferably includes independently displaceable pulley members 300 to engage respective outrigger cords 20. In the disclosed embodiment, the pulley members 300 are made wheel-like to be freely rotatable. Since each pulley member 300 is freely rotatable and exposed to the weather elements on the boat, suitable measures may be necessary to weatherize said pulley members 300, depending on the specific requirements of a particular application. For example, the pulley members 300 may be suitably sealed. Preferably, the pulley members 300 are made of composite, wood, metal, or other such material having enough strength and resilience to withstand the environmental elements, friction, and forces that the members would be typically subjected to during use.

The pulley members 300 define transversely offset cord passages 304 whose concave profiles are directed radially outward to receive and guide respective outrigger cords 20, and maintain their independent longitudinal displacement relative to the outrigger structure 10. The transversely offset cord passages 304 may are formed with annular grooves 310 having, for example U-shaped or V-shaped sectional profiles. The annular grooves 310 are configured to provide lateral support and containment sufficient to avoid slippage of the outrigger cords 20 therefrom.

In preferred embodiments, a plurality of cord management units 30 are arranged along a length of each outrigger structure 10, so that decreasing numbers of transversely offset cord passages 304 are provided by successive unit 30. For example, a system 1 configured to support three separate outrigger cords 20a, 20b, 20c on an outrigger structure 10, as illustrated in FIG. 2, would employ with the pivot unit 50 four cord management units 30a, 30b, 30c, 30d. The cord management units 30a-30d are then arranged to define, along a portion of the outrigger structure 10, a progressively decreasing number of cord passages 304.

In the embodiment illustrated in FIG. 2, for example, the first two cord management units 30a, 30b closest to the boat 5, would preferably each define three cord passages 304 to participate in guiding all three outrigger cords 20a, 20b, 20c. The third cord management unit 30c would preferably define one less cord passage, or two cord passages 304, to participate in guiding just two of the outrigger cords 20b, 20c, since the first outrigger cord 20a pivots at the second cord management unit 30b to return to the pivot unit 50. The next cord management unit 30d may then define even fewer cord passages, or one cord passage 304 in this case, to participate in guiding the one remaining outrigger cords 20c, since the first outrigger cord 20b pivots at the third cord management unit 30c to return to the pivot unit 50.

In certain alternate embodiments, of course, the number of cord management units 30, as well as the arrangement and extent of cord passages defined by respective cord management units 30, may be varied to suit the particular requirements of the intended applications. While not the most efficient, for example, each outrigger cord 20 may be looped about the pivot unit 50 and a set of cord management units 30 whose cord passages pass that outrigger cord 20 only, to the exclusion of the other outrigger cords 20. Each cord management unit might then need to define but one cord passage, but measures would be required to ensure that the cord passages of one cord management unit set (for a given cord 20) are maintained in sufficiently transversely offset manner from the cord passages defined by an adjacent set of such units (for another cord 20) to avoid interfering contact.

In certain other alternate embodiments, one or more of the cord management units 30 may be of modular configuration to facilitate flexible adaptation to different applications. For example, individual pulley member modules 300 may be disposed in replaceable manner within the housing 306 of a cord management unit 30, such that numbers and even the precise positions of the individual pulley or other members 300 within the unit 30 may be adjustably varied to suit different needs. Suitable measures would then be employed to enable such individual replacement of a pulley member module 30, or its re-positioning, within the housing 306.

In preferred embodiments, the pulley members 300 are coaxially aligned, sharing the same shaft. The outrigger cords 20 are secured in the cord passages 304 by a bridge member 302. Preferably, the bridge member 302 is reconfigurably coupled to a housing 306 structure to contain the plurality of outrigger cords 20 in one position and allow their removal in another. The housing 306 is suitably formed to provide structural support and containment for the pulley members 300 and the outrigger cords 20. In the embodiment of FIG. 3, the bridge member 302 is displaceable relative to the pulley members 300 about a hinged coupling between the first and second positions. The first and second positions represent open and closed positions respectively. The plurality of cord management units 30 are longitudinally spaced along the outrigger structure 10 and their housings 306 releasably fastened by clamp member 308. The clamp member 308 may be sleeved onto the outrigger structure 10, selectively positioned on the outrigger structure 10, and fastened by a bolt, snap, strap, fire tie, cable, or other such suitable fastening measures known in the art. The fasteners serve to secure the clamp member 308 to the outrigger structure 10 to prevent the cord management unit 30 from being unintentionally displaced relative to the outrigger structure 10.

Figure 3A:
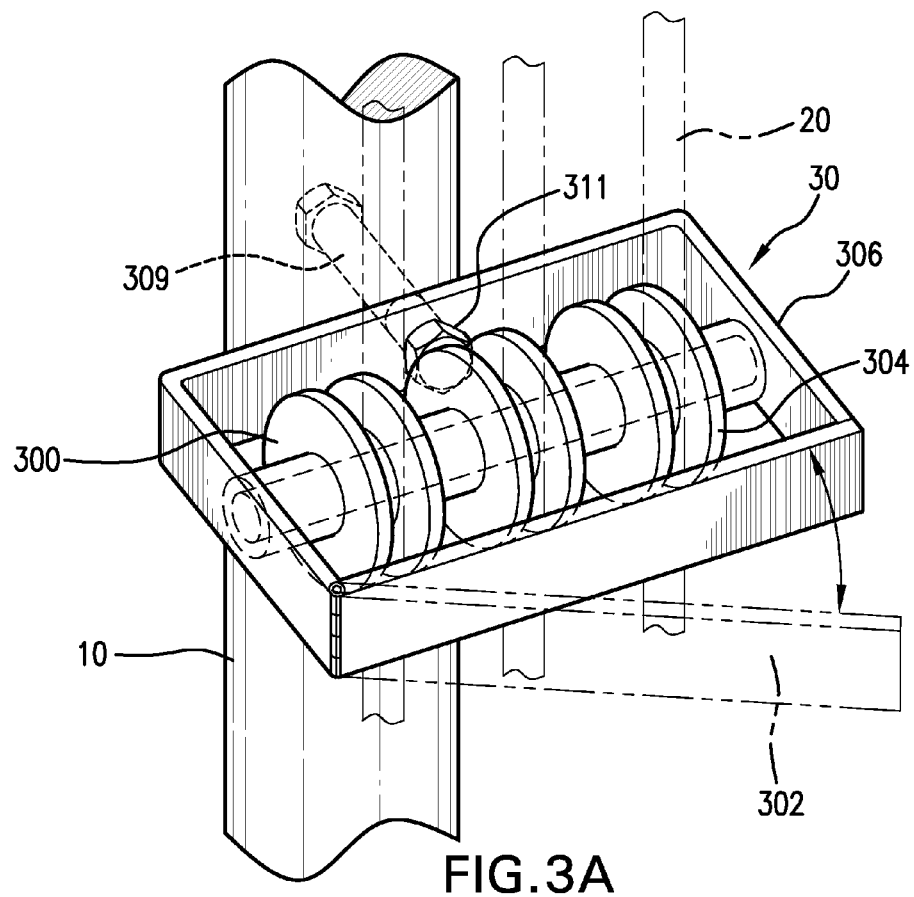
FIG. 3A is a perspective view schematically illustrating a cord management unit formed in accordance with an alternate embodiment of the present invention.

FIG. 3A is an alternate embodiment of the line management system 1 depicted in FIG. 3. The line management system 1 also includes at least one a cord management unit 30 for each cord 20. In broad concept, the cord management unit 30 defines a plurality of transversely offset cord passages 304 which independently guide the outrigger cords 20 longitudinally along the outrigger structure 10. The cord management unit 30 allows for multiple outrigger cords 20 to be independently controlled without undue interference from the other outrigger cords 20.

Each cord management unit 30 preferably includes independently displaceable pulley members 300 to engage respective outrigger cords 20. In the disclosed embodiment, the pulley members 300 are made wheel-like to be freely rotatable. Since each pulley member 300 is freely rotatable and exposed to the weather elements on the boat, suitable measures may be necessary to weatherize said pulley members 300, depending on the specific requirements of a particular application. For example, the pulley members 300 may be suitably sealed. Preferably, the pulley members 300 are made of composite, wood, metal, or other such material having enough strength and resilience to withstand the environmental elements, friction, and forces that the members would be typically subjected to during use.

The pulley members 300 define transversely offset cord passages 304 whose concave profiles are directed radially outward to receive and guide respective outrigger cords 20, and maintain their independent longitudinal displacement relative to the outrigger structure 10. The transversely offset cord passages 304 may are formed with annular grooves 310 having, for example U-shaped or V-shaped sectional profiles. The annular grooves 310 are configured to provide lateral support and containment sufficient to avoid slippage of the outrigger cords 20 therefrom.

In preferred embodiments, a plurality of cord management units 30 are arranged along a length of each outrigger structure 10, so that decreasing numbers of transversely offset cord passages 304 are provided by successive unit 30. For example, a system 1 configured to support three separate outrigger cords 20a, 20b, 20c on an outrigger structure 10, as illustrated in FIG. 2, would employ with the pivot unit 50 four cord management units 30a, 30b, 30c, 30d. The cord management units 30a-30d are then arranged to define, along a portion of the outrigger structure 10, a progressively decreasing number of cord passages 304.

In the embodiment illustrated in FIG. 2, for example, the first two cord management units 30a, 30b closest to the boat 5, would preferably each define three cord passages 304 to participate in guiding all three outrigger cords 20a, 20b, 20c. The third cord management unit 30c would preferably define one less cord passage, or two cord passages 304, to participate in guiding just two of the outrigger cords 20b, 20c, since the first outrigger cord 20a pivots at the second cord management unit 30b to return to the pivot unit 50. The next cord management unit 30d may then define even fewer cord passages, or one cord passage 304 in this case, to participate in guiding the one remaining outrigger cords 20c, since the first outrigger cord 20b pivots at the third cord management unit 30c to return to the pivot unit 50.

In certain alternate embodiments, of course, the number of cord management units 30, as well as the arrangement and extent of cord passages defined by respective cord management units 30, may be varied to suit the particular requirements of the intended applications. While not the most efficient, for example, each outrigger cord 20 may be looped about the pivot unit 50 and a set of cord management units 30 whose cord passages pass that outrigger cord 20 only, to the exclusion of the other outrigger cords 20. Each cord management unit might then need to define but one cord passage, but measures would be required to ensure that the cord passages of one cord management unit set (for a given cord 20) are maintained in sufficiently transversely offset manner from the cord passages defined by an adjacent set of such units (for another cord 20) to avoid interfering contact.

In certain other alternate embodiments, one or more of the cord management units 30 may be of modular configuration to facilitate flexible adaptation to different applications. For example, individual pulley member modules 300 may be disposed in replaceable manner within the housing 306 of a cord management unit 30, such that numbers and even the precise positions of the individual pulley or other members 300 within the unit 30 may be adjustably varied to suit different needs. Suitable measures would then be employed to enable such individual replacement of a pulley member module 30, or its re-positioning, within the housing 306.

In preferred embodiments, the pulley members 300 are coaxially aligned, sharing the same shaft. The outrigger cords 20 are secured in the cord passages 304 by a bridge member 302. Preferably, the bridge member 302 is reconfigurably coupled to a housing 306 structure to contain the plurality of outrigger cords 20 in one position and allow their removal in another. The housing 306 is suitably formed to provide structural support and containment for the pulley members 300 and the outrigger cords 20. In the embodiment of FIG. 3, the bridge member 302 is displaceable relative to the pulley members 300 about a hinged coupling between the first and second positions. The first and second positions represent open and closed positions respectively.

In this embodiment, the housing 306 is coupled to the outrigger structure 10 by a coupling member 309 that is secured by a securing member 311. The coupling member 309 may be a bolt, snap, strap, fire tie, cable, or other such suitable fastening measures known in the art. The coupling member 309 serve to secure the housing 306 to the outrigger structure 10 to prevent the cord management unit 30 from being unintentionally displaced relative to the outrigger structure 10.

The plurality of cord management units 30 are longitudinally spaced along the outrigger structure 10 and their housings 306 releasably fastened by coupling member 309 that is secured by a securing member 311. The coupling member 309 may be a bolt, snap, strap, fire tie, cable, or other such suitable fastening measures known in the art. The coupling member 309 serve to secure the housing 306 to the outrigger structure 10 to prevent the cord management unit 30 from being unintentionally displaced relative to the outrigger structure 10.

Figure 4:
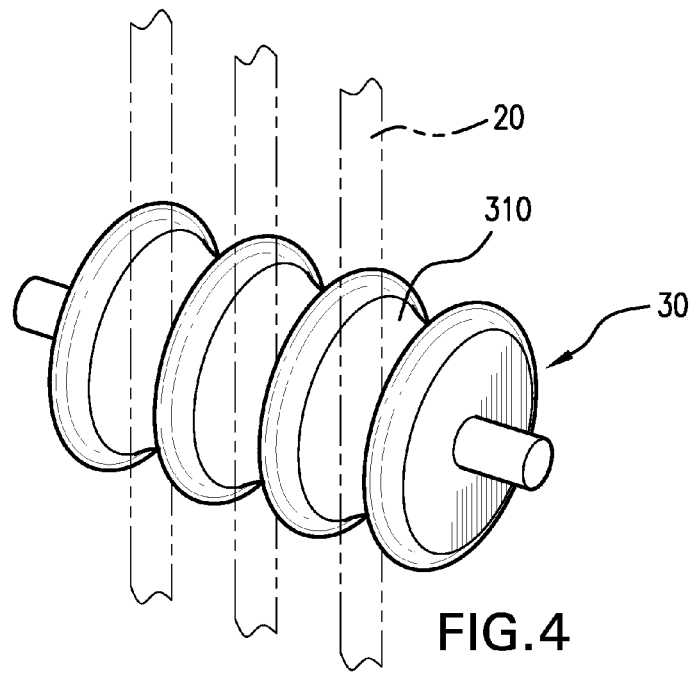
FIG. 4 is a perspective view of a cord management unit formed in accordance with an alternate embodiment of the present invention.

In certain alternate embodiments, such as depicted in FIG. 4, the cord management unit 30 may include a spool-like structure that is integrally formed with a plurality of grooves 310 for receiving respective outrigger cords 20. The cord passages 304 defined within the grooves 310 may be formed of materials with a very low friction coefficient so as to allow individual outrigger cords 20 to smoothly glide along them when displaced. Among other things, the low friction material making up the cord passage 304 in this embodiment would obviate the need for independent pulley members 300 as depicted in FIG. 3. However, this embodiment has the drawback of generating more friction between the outrigger cords 20 and the respective receiving grooves 310.

Figure 5:
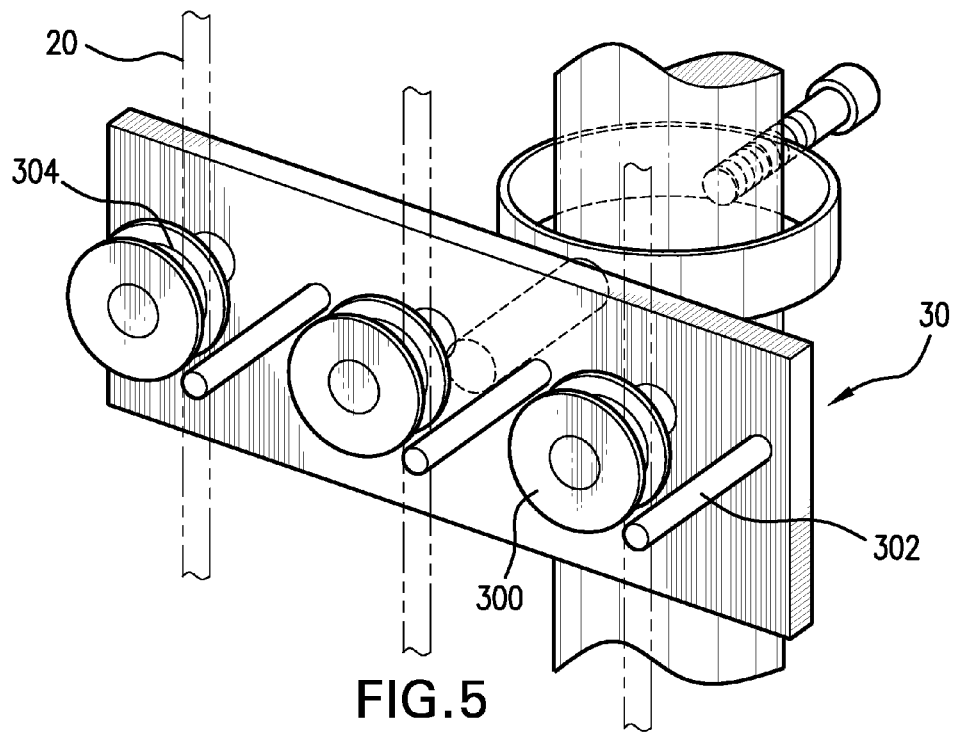
FIG. 5 is a schematic perspective view of a cord management unit formed in accordance with another alternate embodiment of the present invention.

FIG. 5 depicts another alternate embodiment of cord management unit 30. In this embodiment, the independently displaceable pulley members 300 define cord passages 304 that are laterally offset one from the other to respectively guide outrigger cords 20 to maintain independent longitudinal displacement relative to the outrigger structure. The independent pulley members 300 are respectively coupled to individual shafts which allow independent rotation of each pulley member 300. Each bridge member 302 is provided as shown to guard against unwanted release of a cord 20 from its pulley member 300, and thereby retain the outrigger cords 20 operably engaged with the pulley members 300.

Figure 6:
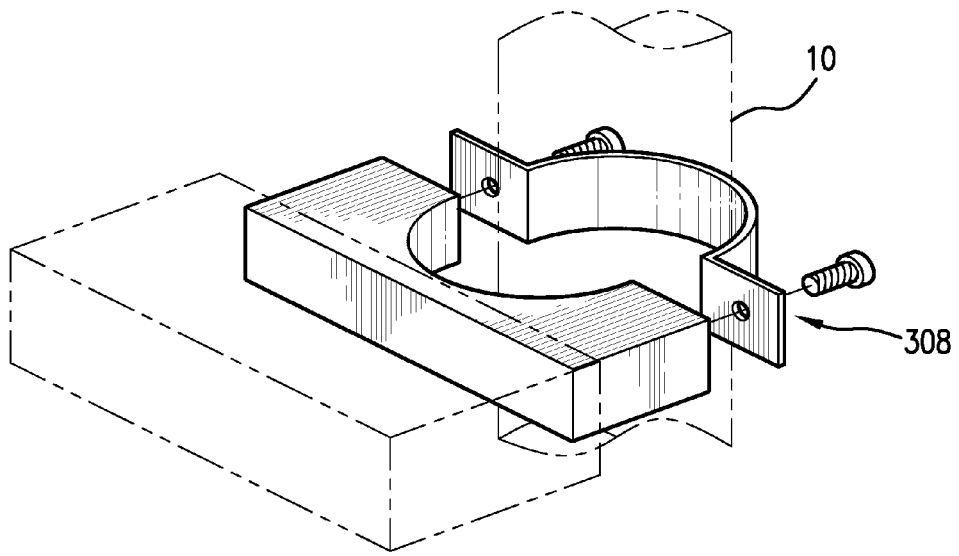
FIG. 6 is an exploded perspective view of a clamp member formed in accordance with another alternate embodiment of the clamp member depicted in FIG. 5; and, FIG. 7 is a perspective view of an eye hook employed in the prior art for guiding cords on an outrigger structure.
Figure 7:
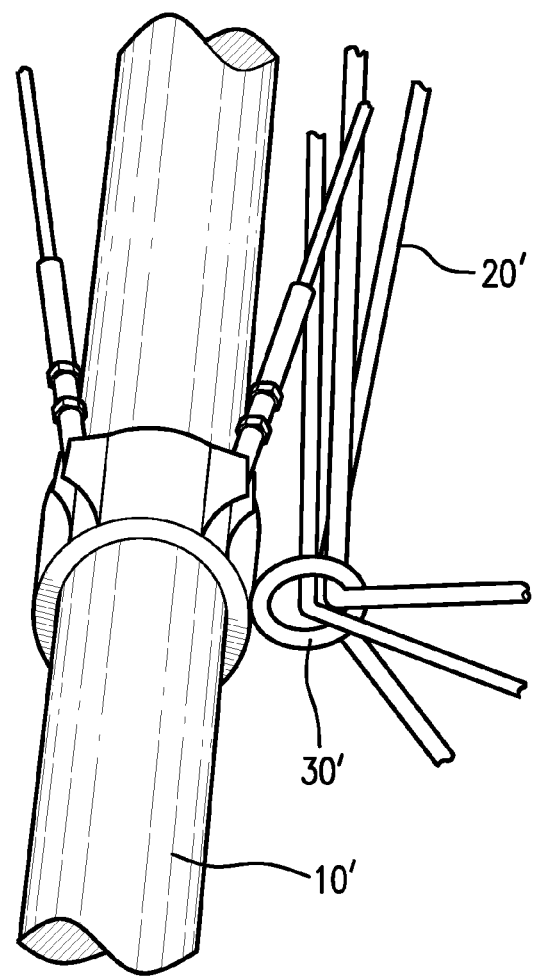

With respect to FIG. 6, there is shown an alternate embodiment of clamp member 308. In this embodiment, the clamp member 308 is made up of two separate pieces contoured to conform and easily fasten to the given outrigger structure 10. The clamp member 308 may be releasably fastened by clamping the separate pieces about the outrigger structure 10 and securing the same with a fastener. The fastener may be a bolt, snap, strap, fire tie, or any other suitable means for fastening the collar-like clamp member 308 pieces to the outrigger structure 10.

The clamping/fastening measures shown in the illustrated embodiments enable each cord management unit 30 to be retrofitted to existing outrigger structures 10. The clamp member 308 may be sleeved onto the outrigger structure 10 or releasably fastened by a suitable fastener. Alternatively, where requirements permit, one or more cord management units 30 may also be formed as a fixed or integral part of an outrigger structure 10 itself.

The application of the cord management system 1 of the present inventions is not limited necessarily to fishing. Its use is relevant in any application that requires an outrigger structure, on or off water, where effective management of outrigger cords 20 is necessary to realize the benefits of the structure. For example, system 1 may be employed to set and deploy traps, set and service instrument buoys, or otherwise facilitate the outrigger-aided use and deployment of various other such articles.

The illustrated embodiments implement a method for managing the outrigger cords which generally includes the steps of: (1) establishing a plurality of outrigger cords 20, (2) establishing a plurality of cord management positions, (3) defining at each cord management position a plurality of transversely offset cord passages 304, (4) arranging the cord management positions, and (5) establishing a plurality of retention devices 40. The cord management positions are established longitudinally spaced one from the other along the outrigger structure 10. A plurality of transversely offset cord passages 304 are defined at certain of the cord management positions to respectively guide predetermined ones of the outrigger cords 20 to maintain independent longitudinal displacement relative to the outrigger structure 10. The cord management positions 304 are arranged to define along at least a portion of the outrigger structure 10 a progressively decreasing number of cord passages 304. The retention devices 40 are thereby established to each define a retention point 400 for advancing a line longitudinally along the outrigger structure 10 responsive to a displacement of the outrigger cord 20.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements as well as particular method steps may be reversed or interposed, all without departing from the spirit or scope of the invention as defined in the appended claims.

What is claimed is:

1. A line management system for a surface vessel, comprising:
    an outrigger structure;
    a plurality of outrigger cords;
    a plurality of cord management units coupled to the outrigger structure, said cord management units being longitudinally spaced one from the other along the outrigger structure, each of said cord management units defining a plurality of cord passages transversely offset one from the other, said cord passages respectively guiding predetermined ones of said outrigger cords to extend substantially in parallel to the outrigger structure so as to extend through respective ones of said cord passages of at least two of said plurality of cord management units and remain independently displaceable longitudinally relative to the outrigger structure; and
    a plurality of retention devices, each of said retention devices coupled to one of said outrigger cords, each of said retention devices defining a retention point for advancing a line longitudinally along the outrigger structure responsive to displacement of said one of said outrigger cords.

2. The line management system as recited in claim 1, wherein at least one of said cord management units includes a plurality of independently displaceable pulley members each engaging one of said outrigger cords.

3. The line management system as recited in claim 2, wherein said at least one of said cord management units further includes at least one bridge member displaceable relative to said pulley members between first and second positions, said at least one bridge member in said first position retaining the engagement of at least one of said outrigger cords with a corresponding one of said pulley members.

4. The line management system as recited in claim 2, wherein said pulley members of said at least one of said cord management units are coaxially disposed one relative to the other.

5. The line management system as recited in claim 1, wherein at least one of said cord management units is releasably fastened to the outrigger structure.

6. The line management system as recited in claim 5, wherein said at least one cord of said management units includes a housing and a clamp member detachably coupled thereto.

7. The line management system as recited in claim 1, wherein each of said retention devices includes a clip portion for releasably retaining a line and a stop cork.

8. The line management system as recited in claim 1, wherein said cord passages of each of said cord management units comprise a plurality of grooves with each of said grooves receiving one of said outrigger cords.

9. An outrigger cord management system for a surface vessel, comprising:
    an outrigger structure;
    a plurality of outrigger cords;
    a plurality of cord management units coupled to the outrigger structure, said cord management units being longitudinally spaced one from the other along the outrigger structure, each of said cord management units defining a plurality of cord passages transversely offset one from the other, said cord passages respectively receiving predetermined ones of said outrigger cords to maintain independent longitudinal displacement thereof relative to the outrigger structure;
    at least one pivot unit laterally offset from the outrigger structure, said at least one pivot unit displaceably retaining each of said outrigger cords, each of said outrigger cords extending from said at least one pivot unit and through predetermined ones of said cord management units in an endless loop; and,
    a plurality of retention devices, each of said retention devices coupled to one of said outrigger cords, each of said retention devices defining a retention point for advancing a line longitudinally along the outrigger structure responsive to displacement of said one of said outrigger cords.

10. The outrigger cord management system as recited in claim 9, wherein each of said cord management units includes a plurality of independently displaceable pulley members each engaging one of said outrigger cords.

11. The outrigger cord management system as recited in claim 10, wherein said pulley members of each of said cord management units are coaxially disposed one relative to the other.

12. The outrigger cord management system as recited in claim 11, wherein each of said cord management units further includes a housing supporting said pulley members, and at least one bridge member coupled to said housing for displacement between first and second positions, said at least one bridge member in said first position retaining the engagement of at least one of said outrigger cords with a corresponding one of said pulley members.

13. The outrigger cord management system as recited in claim 12, wherein each of said cord management units is releasably fastened to the outrigger structure, and each of said cord management units further includes a clamp member detachably coupled thereto.

14. The outrigger cord management system as recited in claim 10, wherein said at least one pivot unit includes a plurality of rotatable members receiving said outrigger cords respectively thereabout.

15. The outrigger cord management system as recited in claim 9, wherein said cord passages of each of said cord management units comprise a plurality of grooves with each of said grooves receiving one of said outrigger cords.

16. A line management system for a surface vessel, comprising:
   an outrigger structure;
   a plurality of outrigger cords;
   a plurality of cord management units coupled to the outrigger structure, said cord management units being longitudinally spaced one from the other along the outrigger structure, each of said cord management units defining a plurality of cord passages transversely offset one from the other, said cord passages respectively guiding predetermined ones of said outrigger cords to maintain independent longitudinal displacement thereof relative to the outrigger structure, wherein at least one of said cord management units includes a plurality of independently displaceable pulley members each engaging one of said outrigger cords;
   a plurality of retention devices, each of said retention devices coupled to one of said outrigger cords, each of said retention devices defining a retention point for advancing a line longitudinally along the outrigger structure responsive to displacement of said one of said outrigger cords; and,
   at least one pivot point unit laterally offset from the outrigger structure, said at least one pivot unit displaceably retaining each of said outrigger cords, each of said outrigger cords extending from said at least one pivot unit and through predetermined ones of said cord management units in an endless loop.

17. The line management system as recited in claim 16, wherein said at least one pivot unit includes a plurality of rotatable members receiving said outrigger cords respectively thereabout.

* * * * *